United States Patent
Mühsam

(10) Patent No.: US 9,619,422 B2
(45) Date of Patent: Apr. 11, 2017

(54) SERVER SYSTEM AND METHOD FOR TRANSFERRING AT LEAST ONE CHASSIS-SPECIFIC CONFIGURATION VALUE

(71) Applicant: Fujitsu Technology Solutions Intellectual Property GmbH, München (DE)

(72) Inventor: Gerhard Mühsam, Königsbrunn (DE)

(73) Assignee: FUJITSU LIMITED, Kawasaki (JP)

( * ) Notice: Subject to any disclaimer, the term of this patent is extended or adjusted under 35 U.S.C. 154(b) by 393 days.

(21) Appl. No.: 14/356,236

(22) PCT Filed: Oct. 26, 2012

(86) PCT No.: PCT/EP2012/071303
§ 371 (c)(1),
(2) Date: May 5, 2014

(87) PCT Pub. No.: WO2013/068250
PCT Pub. Date: May 16, 2013

(65) Prior Publication Data
US 2015/0058506 A1   Feb. 26, 2015

(30) Foreign Application Priority Data

Nov. 9, 2011   (DE) .................. 10 2011 118 058

(51) Int. Cl.
*G06F 13/00* (2006.01)
*G06F 13/40* (2006.01)
*G06F 13/24* (2006.01)

(52) U.S. Cl.
CPC .......... *G06F 13/4027* (2013.01); *G06F 13/24* (2013.01); *G06F 13/409* (2013.01)

(58) Field of Classification Search
CPC .......... G06F 13/00; G06F 1/1632; G06F 13/24
(Continued)

(56) References Cited

U.S. PATENT DOCUMENTS 7,533,210 B2   5/2009   Chatterjee et al.
7,844,768 B2   11/2010   Tanaka
(Continued)

FOREIGN PATENT DOCUMENTS

EP   1 286 272   2/2003
JP   2005-509213   4/2005
(Continued)

OTHER PUBLICATIONS

English translation of the Notice of Reasons for Rejection dated Jun. 30, 2015 of corresponding Japanese Application No. 2014-540389.

*Primary Examiner* — Glenn A Auve
*Assistant Examiner* — Kim T. Huynh
(74) *Attorney, Agent, or Firm* — Fujitsu Patent Center

(57) ABSTRACT

A server system includes a chassis having a plurality of insertion slots that receive a plurality of server plug-in modules; at least one printed circuit board including at least one first microcontroller and arranged in the chassis to contact server plug-in modules received in the insertion slots; and a first server plug-in module including a first system management controller and arranged in a first insertion slot and coupled to the at least one printed circuit board, wherein the first microcontroller and the first system management controller are coupled together via at least one first signal line, and the first microcontroller is arranged to provide the first system management controller with at least one chassis-specific configuration value.

20 Claims, 3 Drawing Sheets

(58) Field of Classification Search
USPC .............. 710/300–306, 100; 361/679.4
See application file for complete search history.

(56) References Cited

U.S. PATENT DOCUMENTS

| | | | |
|---|---|---|---|
| 2005/0034004 A1 | 2/2005 | Bunker et al. | |
| 2005/0283549 A1* | 12/2005 | Gibson | ............... G06F 13/385 710/62 |
| 2006/0184349 A1* | 8/2006 | Goud | ............... G06F 9/45537 703/24 |

FOREIGN PATENT DOCUMENTS

| | | |
|---|---|---|
| JP | 2006-277033 | 10/2006 |
| JP | 2008-015803 | 1/2008 |
| JP | 2008-083841 | 4/2008 |
| JP | 2009-187123 | 8/2009 |
| JP | 2010-122760 A | 6/2010 |
| JP | 2011-039920 | 2/2011 |

* cited by examiner

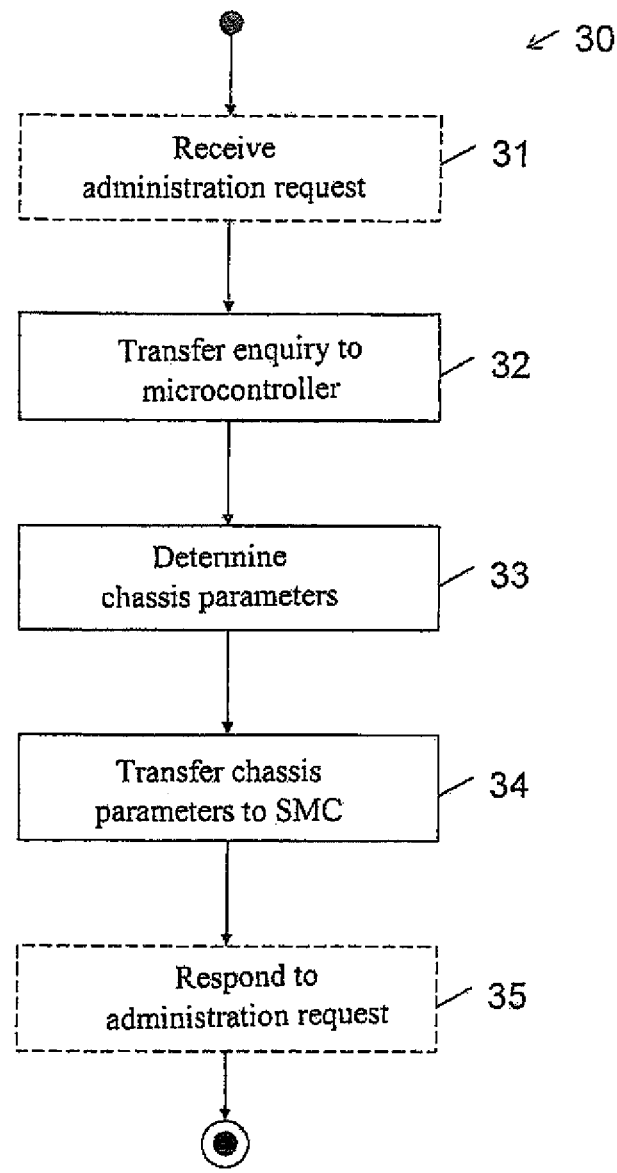

SERVER SYSTEM AND METHOD FOR TRANSFERRING AT LEAST ONE CHASSIS-SPECIFIC CONFIGURATION VALUE

TECHNICAL FIELD

This disclosure relates to a server system comprising a chassis, at least one printed circuit board arranged in the chassis and a first server plug-in module arranged in a first insertion slot of the chassis and coupled to the at least one printed circuit board. The disclosure further relates to a method of transferring at least one chassis-specific configuration value in such a server system.

BACKGROUND

Server systems having a chassis that receives a plurality of server plug-in modules are known in many forms. For example, so-called "blade server" systems are known in which a plurality of blade server plug-in modules are arranged in a common chassis. In addition to the server plug-in modules, further components are arranged in the chassis such as, for example, switches, power supplies and mass storage device components used commonly by the blade server plug-in modules. To manage such server systems, a so-called "management blade" is generally used, via which the state of the individual components of the blade server system can be retrieved.

In contrast, in other server systems, in particular in so-called "rack server" systems without a central control entity, there is generally no central management of components of a server system. Instead, individual server systems often have a so-called "system management controller," via which each server plug-in module can be managed separately. A problem with this approach is that chassis-specific configuration values such as, for example, an installation position of a server plug-in module within a chassis, cannot readily be determined.

It could therefore be helpful to provide a server system which allows for the retrieval and processing of chassis-specific configuration values in a server system without a dedicated management unit and, in particular, without a dedicated network interface, along with a method of transferring at least one chassis-specific configuration value in such a server system.

SUMMARY

I provide a server system including a chassis having a plurality of insertion slots that receive a plurality of server plug-in modules; at least one printed circuit board including at least a first microcontroller and a second microcontroller and arranged in the chassis to contact server plug-in modules received in the insertion slots; a first server plug-in module including a first system management controller and arranged in a first insertion slot and coupled to the at least one printed circuit board; and a second server plug-in module including a second system management controller and arranged in a second insertion slot and coupled to the at least one printed circuit board, wherein the first microcontroller and the first system management controller are coupled together via at least one first signal line, and the first microcontroller is arranged to provide the first system management controller with at least one chassis-specific configuration value; and the second microcontroller and the second system management controller are coupled together via at least one second signal line, and the second microcontroller is arranged to provide the system management controller with the at least one chassis-specific configuration value.

I also provide a method of transferring at least one chassis-specific configuration value of a server system including request a chassis-specific configuration value by a first system management controller of a first server plug-in module of the server system; transferring a request from the first system management controller via at least one first signal line to a first microcontroller arranged on a printed circuit board of a chassis of the server system; determining the chassis-specific configuration value by the first microcontroller; and transferring the at least one chassis-specific configuration value from the first microcontroller via the at least one first signal line to the first system management controller.

BRIEF DESCRIPTION OF THE DRAWINGS

FIG. 3 shows a flow diagram of a method of transferring a chassis-specific configuration value.

LIST OF REFERENCE NUMERALS

Figure 1:
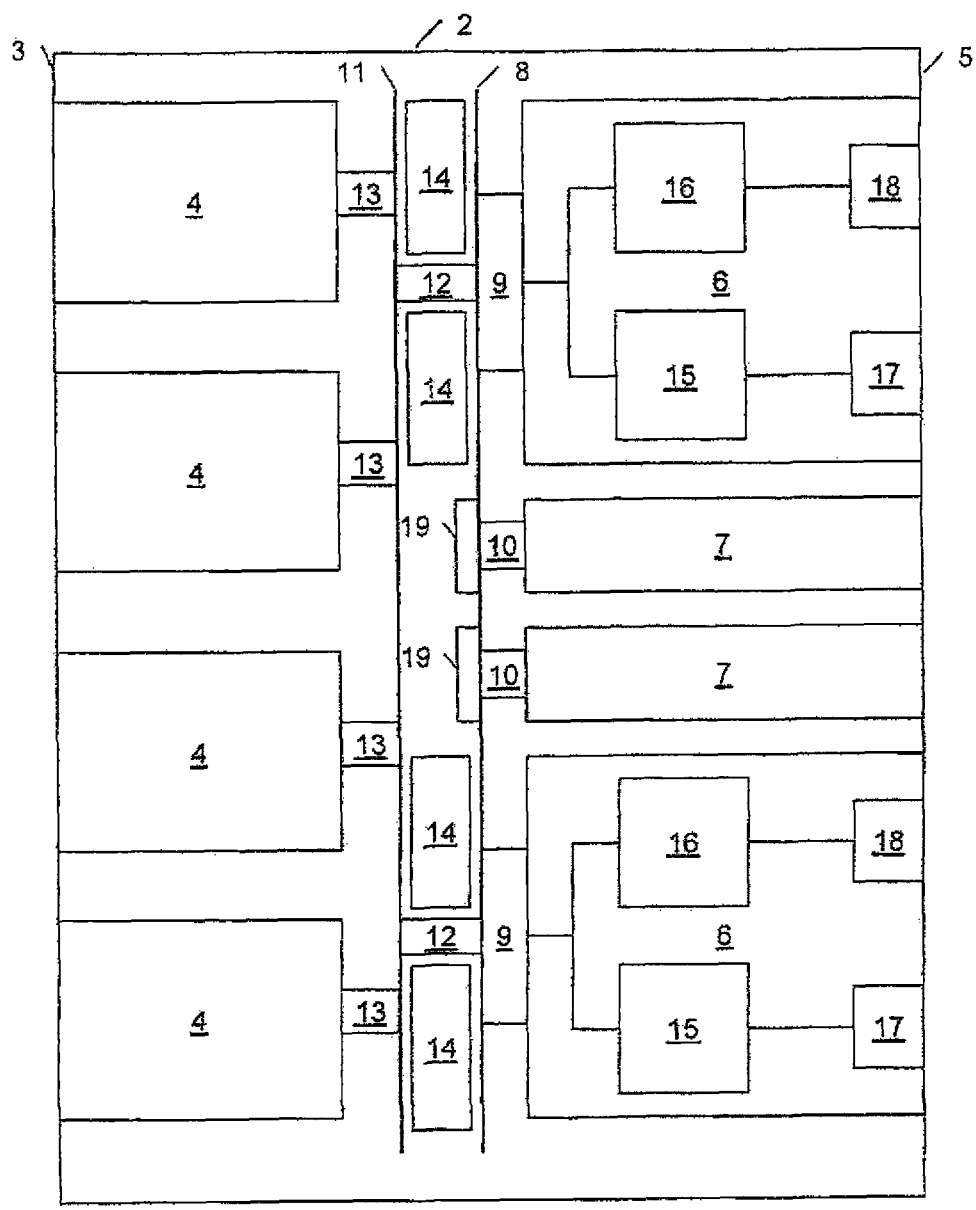
FIG. 1 shows a schematic illustration of an example of my server system.

1 Server system
2 Chassis
3 Front side
4 Hard disk drive
5 Rear side
6 Server plug-in module
7 Power supply
8 Midplane
9 Plug connector
10 Further plug connector
11 Backplane
12 Printed circuit board connector
13 Plug connector
14 Fan module
15 Microprocessor
16 System management controller
17 Network interface
18 Further network interface
19 Microcontroller
21 Chassis half
22 Insertion slot
23 First signal line
24 Second signal line
25 Third signal line
26 Plug connector
27 Fourth signal line
28 First memory element
29 Second memory element
30 Method
31 to 35 Method steps

DETAILED DESCRIPTION

I provide a server system that may comprise a chassis having a plurality of insertion slots that receive a plurality of server plug-in modules. The server system comprises at least one printed circuit board arranged in the chassis to contact server plug-in modules received in the insertion slots, wherein the printed circuit board comprises at least one first microcontroller. The server system also comprises a first server plug-in module arranged in a first insertion slot and coupled to the at least one printed circuit board, wherein the first server plug-in module comprises a first system management controller. The first microcontroller and the first system management controller are coupled together via at least one first signal line and the first microcontroller is arranged to provide the first system management controller with at least one chassis-specific configuration value.

Such a server system allows indirect access to chassis-specific configuration values by a connection between a system management controller of a server plug-in module such as, in particular, a so-called "baseboard management controller" (BMC), and a microcontroller arranged on a printed circuit board used to contact different components of the server system such as, in particular, a so-called "midplane."

At least one plug connector may be arranged on the printed circuit board in the region of each insertion slot to connect a server plug-in module received into the respective insertion slot, wherein a first plug connector is arranged in the region of the first insertion slot and connects to the first microcontroller via the first signal line, and a second plug connector is arranged in the region of a second insertion slot and connects to the first microcontroller via a second signal line independent of the first signal line. By allocating different insertion slots to different signal lines, the first microcontroller can determine in which insertion slot a server plug-in module is arranged and supply a corresponding configuration value back to the first system management controller.

The first server plug-in module may comprise a first network interface to establish a first network connection to an external management unit and the first system management controller is arranged to transmit the provided chassis-specific configuration values via the first network connection to an external management unit. By providing a network interface, an external management unit can perform a so-called "out-of-band configuration" and administration of the server system via the first server plug-in module.

The system may comprise at least one further insertion slot with a second server plug-in module arranged therein and may have a second system management controller. Furthermore, a second microcontroller is arranged on the at least one printed circuit board, wherein the second microcontroller and the second system management controller are coupled together via at least one third signal line and are arranged in an equivalent manner to the first microcontroller and the first system management controller to transfer configuration values. By duplicating components that retrieve chassis-specific configuration values, availability of the administration option can be ensured, even if individual components of the server system fail.

I also provide a method of transferring at least one chassis-specific configuration value of a server system. The method includes the steps of:
  requesting a chassis-specific configuration value by a first system management controller of a first server plug-in module of the server system,
  transferring the request from the first system management controller via at least one first signal line to a first microcontroller arranged on the printed circuit board of a chassis of the server system,
  determining the chassis-specific configuration value by the first microcontroller, and
  transferring the at least one chassis-specific configuration value from the first microcontroller via the at least one first signal line to the first system management controller.

A chassis-specific configuration value can be determined indirectly by a system management controller of a server plug-in module of a server system with those steps.

The at least one chassis-specific configuration value may contain information regarding an insertion slot in which the first server plug-in module is received, wherein in the step of determining by the first microcontroller, a data line is determined, via which the request was transferred and a determination is made on the basis of the determined data line as to which insertion slot of a plurality of insertion slots the server plug-in module is received in.

The at least one chassis-specific configuration value may relate to information regarding the operating state of a further component of the server system, wherein the further component connects to a second microcontroller arranged on the printed circuit board and the second microcontroller requests the operating state of the further component and stores it in a common memory connected to the first and second microcontrollers. By providing a plurality of microcontrollers to monitor the operating states of different components of the server system and storing corresponding values in a memory commonly used by the microcontrollers, an operating state of further components of the server system can be indirectly requested, even if these components are not directly connected to the first microcontroller.

Further advantages are disclosed in the following detailed description of examples.

In the figures and the following description, different instances of similar components are differentiated by the appending of a suffix. If the component is considered generally or the differentiation is not important, a suffix is not used.

FIG. 1 schematically shows a cross-section through a horizontal plane of a server system 1.

The server system 1 includes a chassis 2 which, in the example, is suitable to be inserted into a 19-inch rack which is not illustrated in FIG. 1. A plurality of hard disk drives 4 are inserted from a front side 3 into suitable plug-in locations of the chassis 2. Server plug-in modules 6 and two power supplies 7 are inserted from a rear side 5 into corresponding insertion slots of the chassis 2.

The components 6 and 7 inserted from the rear side 5 electrically connect to a printed circuit board in the form of a midplane 8 within the chassis 2. For this purpose, in the example, plug connectors 9 are provided to connect the server plug-in modules 6 and further plug connectors 10 are provided to connect the power supplies 7. The hard disk drives 4 are likewise indirectly connected to the midplane 8 and also to the server plug-in modules 6 via a further printed circuit board in the form of a so-called "backplane" 11 and one or more printed circuit board connectors 12. The allocation between the server plug-in modules 6 and hard disk drives 4 can be effected either in a fixed manner via the midplane 8 and backplane 11 or selectively via an SATA port selector arranged in a server plug-in module 6, an SAS expander or other switch.

A total of 24 plug connectors 13 are arranged on the backplane 11 to connect up to 24 hard disk drives 4. In each case, up to six hard disk drives 4 are arranged one above the other and, as shown in FIG. 1, in each case four hard disk drives 4 are arranged next to each other in the chassis 2. The chassis 2 is further suitable to receive a total of four server plug-in modules 6, wherein, as shown in FIG. 1, two server plug-in modules 6 are arranged next to each other on the left and on the right on the rear side 5 of the chassis and in each case two further server plug-in modules 6 are disposed thereabove or therebelow. The power supplies 7 extend, in the illustrated example, over the entire height of the chassis 2, which, e.g., has a height of two height units (2 U) or approximately 8.9 cm. Alternatively, the two power supplies can naturally also be arranged one above the other.

A total of four fan modules 14 are arranged between the backplane 11 and the midplane 8 and draw in cooling air from the front side 3 through the front region of the chassis 2 having the hard disk drives 4 arranged therein and blow out the cooling air through the rear region of the chassis 2 having the server plug-in modules 6 and power supplies 7 arranged therein.

The server plug-in modules 6 are mainboards on each of which at least one microprocessor 15 to perform server applications and a system management controller (SMC) 16 to manage the respective server plug-in module 6 are arranged. In the illustration of FIG. 1, the microprocessor 15 of each server plug-in module 6 is coupled to a data network, not illustrated in FIG. 1, via a first network interface 17. Furthermore, the system management controllers 16 are coupled, via a further network interface 18, to the same or a further data network for administration of the server plug-in modules 6. Together, the system management controller 16 and the network interface 18 provide an out-of-band management interface for remote maintenance of the server plug-in module 6 by an external management unit.

Finally, two microcontrollers 19 that provide configuration values in relation to the chassis 2 are arranged on the midplane 8. The functions and connections of the microcontrollers to the other components of the server system 1 will be explained in more detail hereinunder. The provided configuration values are, for example, an insertion position of a plug-in module server 6, data in relation to monitoring the function of the fan modules 14 and/or power supplies 7, or a data set of a so-called field replaceable unit (FRU).

Figure 2:
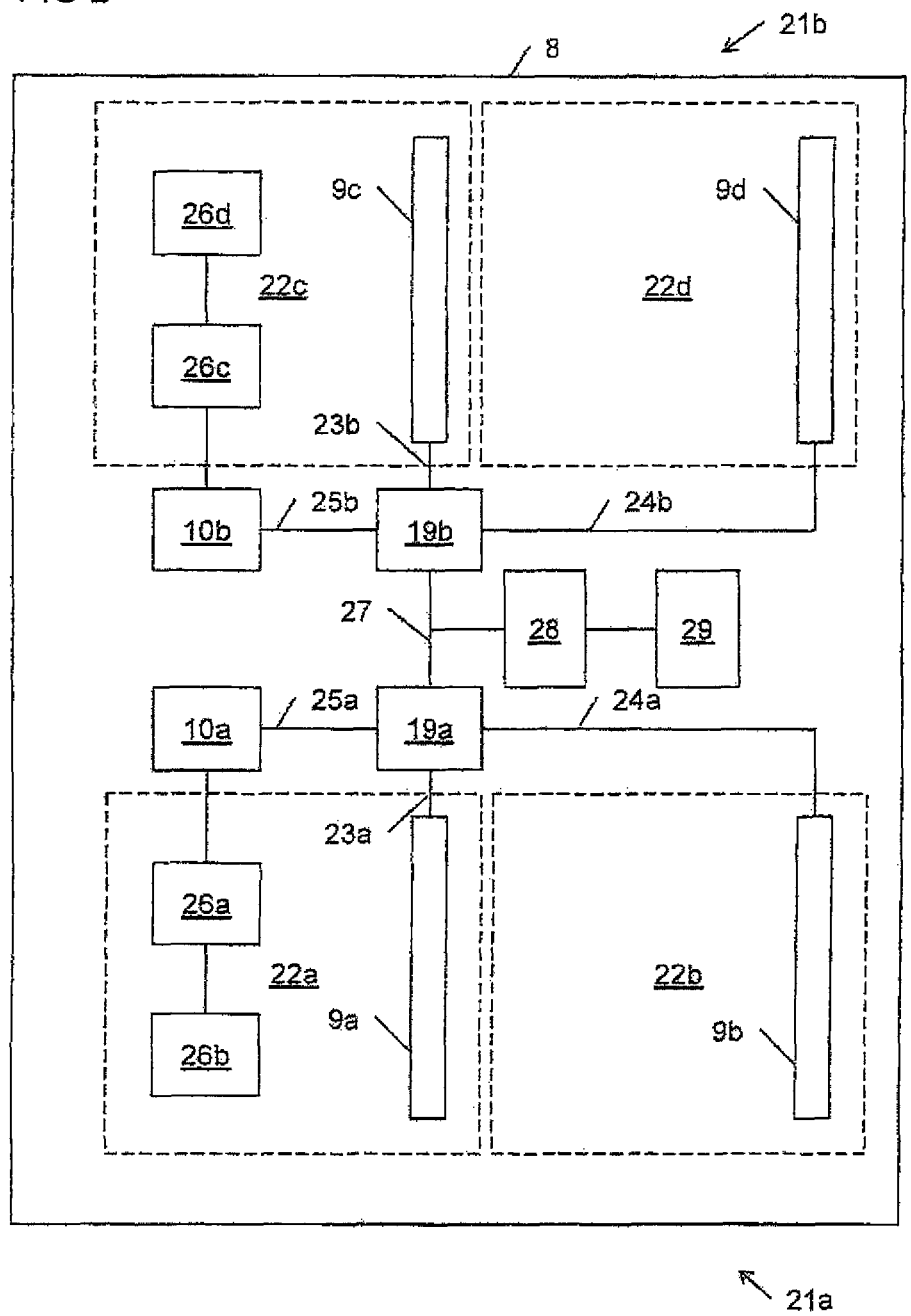
FIG. 2 shows a schematic illustration of a printed circuit board of the server system of FIG. 1.

FIG. 2 shows a schematic illustration of the midplane 8. A first microcontroller 19*a* and a second microcontroller 19*b* are arranged on the midplane 8. The microcontrollers 19*a* and 19*b* are so-called "H8" controllers from Hitachi. Of course, any other microprocessor having a suitable number of inputs and outputs can also be used.

The first microcontroller 19*a* monitors the components of the server system 1 which are arranged in the left chassis half 21*a* thereof. In a corresponding manner, the second microcontroller 19*b* monitors the components which are arranged in the right chassis half 21*b* of the server system 1.

The first microcontroller 19*a* connects via a first signal line 23*a* to the plug connector 9*a* of the left, upper insertion slot 22*a* of the server system 1 shown as a dashed line in FIG. 2. The plug connector 9*b* connects to the microcontroller 19*a* via a second signal line 24*a* in the region of the left, lower insertion slot 22*b*. Further components of the server system 1 connect to the first microcontroller 19*a* via a third signal line 25*a*. For example, two plug connectors 26*a* and 26*b* connect to the third signal line 25*a* to activate the two fan modules 14 not shown in FIG. 2. Furthermore, a plug connector 10*a* connects to the third signal line 25*a* to connect the left power supply 7. Equivalently, the second microcontroller 19*b* connects to the plug connectors 9*c* or 9*d* via signal lines 23*b* and 24*b* and connects to the plug connectors 26*c* and 26*d* and 10*b* of the right chassis half 21*b* via a signal line 25*b*.

The signal lines 23 to 25 are, for example, signal lines for a serial data bus such as, in particular, the so-called "I²C" bus. Therefore, the microcontrollers 19*a* and 19*b* can, in a controlled manner, exchange data with or request data from the individual components of the left chassis half 21*a* and the right chassis half 21*b* via suitable addressing and optional allocation of signals to the first, second or third signal line 23, 24, 25.

In addition, the first microcontroller 19*a* and the second microcontroller 19*b* connect to a first memory element 28 and a second memory element 29 via a fourth signal line 27 which, in the example, is likewise designed as a serial bus system. Of course, instead of two separate memory elements 28 and 29, different memory areas of a common memory element or internal memory of one of the microcontrollers 19*a* or 19*b* can also be used. Preferably, the first memory element 28 or a common memory element is designed as a non-volatile flash memory element and has an interface controller in accordance with the I²C bus.

Information regarding assemblies of the server system 1 are stored in the non-volatile first memory element 28 or in the non-volatile first memory area. For example, this can be a so-called "FRU data set" (field replaceable unit) in accordance with the Intelligent Platform Management Interface (IPMI) standard. Different chassis-specific data such as, for example, a unique serial number, a version number or other manufacturer details are stored in an FRU data set.

Equivalently, the second memory element 29 or memory area is a volatile or non-volatile memory, in which current configuration data, operating states and error messages from the first microprocessor 19*a* and/or the second microcontroller 19*b* are stored. The two microcontrollers 19*a* and 19*b* communicate with each other by the second memory element 29. For example, the first microcontroller 19*a* can store data regarding the failure of a fan module 14, connected to the plug connector 26*a*, in the commonly used memory of the memory element 29. This information can then be retrieved from the commonly used memory by a server plug-in module 6, connected to the plug connector 9*c*, via the second microcontroller 19*b*.

FIG. 3 shows a flow diagram of a method 30 of transferring at least one chassis-specific configuration value. The method 30 of FIG. 3 is suitable in particular for use in the server system 1 of FIGS. 1 and 2.

In an optional step 31, an administration request is received. For example, a system administrator of the server system 1 can transmit a corresponding inquiry from an external management unit to the system management controller 16 of a first server plug-in module 6 via a network connection. Suitable means for this include, for example, a proprietary user interface of the system management controller 16 or a standardized management protocol such as, for example, an interface in accordance with the Intelligent Platform Management Interface (IPMI). Alternatively, a request can also be generated by the system management controller 16 itself.

The request can be directed, for example, to a request for an operating state of the components 4, 6, 7 and/or 14 installed in the server system 1. For example, a request can be made as to whether the two power supplies 7 are supplying a required voltage to operate the left or right chassis halves 21*a* or 21*b*, whether an error has occurred in a hard disk drive 4, what temperature has been detected by a temperature sensor of a fan controller of one of the fan modules 14, or how many, and what type of, server plug-in modules 6 are inserted into the server system 1. Furthermore, a position of a particular server plug-in module 6 within the server system 1 can also be requested.

In a step 32, an inquiry is transmitted from the system management controller 16 to one of the microcontrollers 19 on the midplane 8. Depending upon which of the server plug-in modules 6 detected the administration request in step 31, the corresponding inquiry is transmitted to the first microcontroller 19a or the second microcontroller 19b via one of the signal lines 23a, 23b, 24a or 24b. For this purpose, the system management controller 16 sends a correspondingly encoded inquiry addressed to the microcontroller 19a or 19b in accordance with the I²C protocol. The request may be effected via a server plug-in module 6 in the first insertion slot 22a and thus via the first signal line 23a.

In a step 33, the microcontroller 19a or 19b determines the chassis parameter required to answer the inquiry. For example, the first microcontroller 19a can retrieve FRU data from the first memory element 28 or can read out, via the fourth signal line 27, operating data which were stored in the second memory element 29 by the first microcontroller 19a or the second microcontroller 19b. Of course, direct communication with suitable components such as, for example, a microcontroller of one of the power supplies 7 or one of the fan modules 14, is also possible.

If the inquiry transmitted in step 32 includes an inquiry regarding the installation position of a server plug-in module 6, the microcontroller 19a determines the signal line via which it has received the inquiry. If the inquiry was received from the first plug connector 9a via the first signal line 23a, then the inquiring server plug-in module 6 is located, for example, in the left, upper insertion slot 22a. Conversely, the inquiring server plug-in module 6 is located in the left, lower insertion slot 22b if the microcontroller 19a has received the inquiry via the second signal line 24a.

It is also possible to divide and relay the inquiries to further components to obtain a complete system configuration of the server system. For example, such an inquiry regarding the memory element 29 can be forwarded to the second microcontroller 19b or answered by data previously stored at that location. The second microcontroller 19b detects a configuration of the right chassis half 21b via a corresponding request to the server plug-in modules 6c and 6d, if provided, which in turn return information regarding server-internal components such as, for instance, a processor used or memory configuration, or components connected thereto such as, for instance, hard disk drives 4 connected by the backplane 11 via SAS or SATA. The data detected by the second microcontroller 19b are stored in the second memory element 29. In the same manner, the first microcontroller 19a determines information regarding the server plug-in modules 6a and 6b, if provided, and combines this information with the information determined by the second microcontroller 19b to provide a response to the inquiring system management controller 16.

In a step 34, the chassis parameter(s) determined in step 33 are transferred back to the inquiring system management controller 16. For this purpose, the microcontroller 19a may again use a serial communication in accordance with the I²C protocol and sends the determined chassis parameter(s) to the address of the system management controller 16.

The chassis parameter transferred in step 34 can then either be locally stored by the system management controller 16 of the server plug-in module 6 or be further processed or, in an optional step 35, be transferred back to an external management unit, e.g., a control computer of the system administrator.

If a server plug-in module 6 having an installed system management controller 16 is inserted in several insertion slots of the server system 1, then a corresponding administration request can be transmitted to the first microcontroller 19a or the second microcontroller 19b by each of the server plug-in modules 6. This is particularly advantageous if, because of a fatal error, parts of the server system 1 completely fail.

If the second microcontroller 19b recognises, for example, the failure of one of the fan modules 14 of the right chassis half 21b or it receives an error message from the right power supply 7, it generates corresponding status information and stores this in the memory element 29. Subsequently, it deactivates the components of the right chassis half 21b, i.e., for example, the server plug-in modules 6 connected to the plug connectors 9c and 9d, the fan modules 14 connected to the plug connectors 26c and 26d, and the power supply 7 connected to the plug connector 10b. Therefore, neither the server plug-in modules 6 of the right chassis-half 21b nor the microcontroller 19b can be reached. However, the status messages previously stored by the microcontroller 19b can still be read out from the commonly used memory of the memory element 29 by a server plug-in module 6 connected to one of the first plug connector 9a or second plug connector 9b, by the first microcontroller 19a.

As described above, the overall configuration of the server system 1 can also be determined via the memory element 29. As a result, the configuration of the entire server system 1 can thus be retrieved and managed via a system management controller 16 of any server plug-in module 6, wherein the administration is effected, in the described example, via a system management network connected to the system management controller 16 and by a separate system management network, i.e., out-of-band.

The invention claimed is:

1. A server system comprising:
a chassis having a plurality of insertion slots that receive a plurality of server plug-in modules;
at least one midplane comprising at least a first plug connector, a second plug connector, a first microcontroller and a second microcontroller, the first plug connector, the second plug connector, the first microcontroller and the second microcontroller being arranged on the midplane, the midplane being arranged in the chassis to contact server plug-in modules received in the insertion slots;
a first server plug-in module comprising a first system management controller arranged in the first server plug-in module, the first server plug-in module being arranged in a first insertion slot and coupled to the at least one midplane via the first plug connector; and
a second server plug-in module comprising a second system management controller arranged in the second server plug-in module, the second server plug-in module being arranged in a second insertion slot and coupled to the at least one midplane via the second plug connector,
wherein
the first microcontroller arranged on the midplane and the first system management controller arranged in the first server plug-in module are coupled together via at least one first signal line connected to the first plug connector, and the first microcontroller is configured to provide the first system management controller with at least one chassis-specific configuration value; and
the second microcontroller arranged on the midplane and the second system management controller arranged in the second server plug-in module are coupled together via at least one second signal line connected to the second plug connector, and the second microcontroller is configured to provide the second system management controller with the at least one chassis-specific configuration value.

2. The server system according to claim 1, wherein the first microcontroller and the second microcontroller are coupled to a common memory, and the at least one chassis-specific configuration value is stored in the common memory.

3. The server system according to claim 1, wherein the server system comprises a plurality of components selected from server plug-in modules, fans, mass memory devices and/or current supply units, the first microcontroller is coupled to a first subset of the plurality of components and arranged to monitor an operating state of the component of the first subset, and the second microcontroller is coupled to a second subset of the plurality of components, different from the first subset, and is arranged to monitor an operating state of the components of the second subset.

4. A server system comprising:
a chassis having a plurality of insertion slots that receive a plurality of server plug-in modules;
at least one midplane comprising at least one first plug connector and at least one first microcontroller, the at least one first plug connector and at least one first microcontroller being arranged on the midplane, the midplane being arranged in the chassis to contact server plug-in modules received in the insertion slots; and
a first server plug-in module comprising a first system management controller arranged in the first server plug-in module, the first server plug-in module being arranged in a first insertion slot and coupled to the at least one midplane via the at least one first plug connector,
wherein the first microcontroller arranged on the midplane and the first system management controller arranged in the first server plug-in module are coupled together via at least one first signal line connected to the at least one first plug connector, and the first microcontroller is configured to provide the first system management controller with at least one chassis-specific configuration value.

5. The server system according to claim 4, wherein the first system management controller and the first microcontroller are arranged for serial communication via the first data line, in particular in accordance with the I²C protocol.

6. The server system according to claim 4, wherein at least one plug connector is arranged on the at least one midplane in a region of each insertion slot to connect a server plug-in module received into the respective insertion slot, a first plug connector is arranged in a region of the first insertion slot and connects to the first microcontroller via the first signal line, a second plug connector is arranged in the region of a second insertion slot and connects to the first microcontroller via a second signal line independent of the first signal line.

7. The server system according to claim 4, wherein the first server plug-in module comprises a first network interface to establish a first network connection to an external management unit and the first system management controller is arranged to transmit the provided chassis-specific configuration value via the first network connection to an external management unit.

8. The server system according to claim 7, wherein the first server plug-in module comprises a second network interface to establish a further network connection to an application performed by the server plug-in module.

9. The server system according to claim 4, wherein the first microcontroller functionally connects to a non-volatile memory, and the first microcontroller is arranged to read out at least one characteristic of the server system stored in the non-volatile memory and to transmit said at least one characteristic via the first signal line to the first system management controller.

10. The server system according to claim 4, wherein the server system comprises at least one commonly used component selected from a fan, a mass memory device and/or a current supply unit, and the first microcontroller is arranged to monitor the operating state of the at least one commonly used component and to transmit said operating state to the first system monitoring element.

11. The server system according to claim 4, wherein a second server plug-in module having a second system management controller is arranged in a further insertion slot of the server system, a second microcontroller is arranged on the at least one midplane, and the second microcontroller and the second system management controller are coupled together via at least one third signal line and the second microcontroller is arranged to provide the second system management controller with the at least one chassis-specific configuration value.

12. The server system according to claim 11, wherein the first microcontroller and the second microcontroller are coupled to a common memory, and the at least one chassis-specific configuration value is stored in the common memory.

13. The server system according to claim 11, wherein the server system comprises a plurality of components selected from server plug-in modules, fans, mass memory devices and/or current supply units, the first microcontroller is coupled to a first subset of the plurality of components and arranged to monitor an operating state of the component of the first subset, and the second microcontroller is coupled to a second subset of the plurality of components, different from the first subset and is arranged to monitor an operating state of the components of the second subset.

14. A method of transferring at least one chassis-specific configuration value of a server system comprising:
requesting a chassis-specific configuration value by a first system management controller arranged in a first server plug-in module of the server system;
transferring a request from the first system management controller arranged in the first server plug-in module via at least one first plug connector and a first signal line connected to the first plug connector to a first microcontroller, the first plug connector, the first signal line and the first microcontroller being arranged on a midplane of a chassis of the server system;
determining the chassis-specific configuration value by the first microcontroller; and
transferring the at least one chassis-specific configuration value from the first microcontroller arranged on the midplane via the at least one first signal line and the first plug connector to the first system management controller arranged in the first server plus-in module.

15. The method according to claim 14, further comprising:
transferring the at least one chassis-specific configuration value from the first system management controller via at least one network connection to an external management unit.

16. The method according to claim 14, wherein the at least one chassis-specific configuration value contains information regarding an insertion slot in which the first server plug-in module is received, and, in the step of determining by the first microcontroller, a data line is determined, via which the request was transferred and a determination is made on the basis of the determined data line as to which insertion slot of the plurality of insertion slots of the server system the server plug-in module is received in.

17. The method according to claim 14, wherein the at least one chassis-specific configuration value contains information relating to the operating state of a further component of the server system, and the further component connects to a second microcontroller arranged on the midplane and the second microcontroller requests the operating state of the further component and stores it in a common memory connected to the first and second microcontrollers.

18. The method as claimed in claim 17, wherein, in the event of a non-correctable error, the second microcontroller stores information regarding the error which has occurred in the common memory and interrupts a current supply for at least one component connected with the second microcontroller.

19. The server system according to claim 2, wherein the server system comprises a plurality of components selected from server plug-in modules, fans, mass memory devices and/or current supply units, the first microcontroller is coupled to a first subset of the plurality of components and arranged to monitor an operating state of the component of the first subset, and the second microcontroller is coupled to a second subset of the plurality of components, different from the first subset, and is arranged to monitor an operating state of the components of the second subset.

20. The method according to claim 15, wherein the at least one chassis-specific configuration value contains information regarding an insertion slot in which the first server plug-in module is received, and, in the step of determining by the first microcontroller, a data line is determined, via which the request was transferred and a determination is made on the basis of the determined data line as to which insertion slot of the plurality of insertion slots of the server system the server plug-in module is received in.

\* \* \* \* \*